(12) United States Patent
Batz et al.

(10) Patent No.: US 9,009,293 B2
(45) Date of Patent: Apr. 14, 2015

(54) SYSTEM AND METHOD FOR REPORTING PACKET CHARACTERISTICS IN A NETWORK ENVIRONMENT

(75) Inventors: Robert Batz, Raleigh, NC (US);
Richard A. Galatioto, Cary, NC (US);
Juan M. Mojica, Cary, NC (US);
Humberto M. Taváres, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 12/621,066

(22) Filed: Nov. 18, 2009

(65) Prior Publication Data
US 2011/0116377 A1 May 19, 2011

(51) Int. Cl.
*H04L 12/26* (2006.01)
*H04L 12/851* (2013.01)
(Continued)

(52) U.S. Cl.
CPC .......... *H04L 47/2425* (2013.01); *H04L 43/026* (2013.01); *H04L 47/10* (2013.01); *H04L 47/14* (2013.01); *H04L 47/193* (2013.01); *H04L 47/20* (2013.01); *H04L 47/2483* (2013.01); *H04L 63/123* (2013.01); *H04L 63/164* (2013.01); *H04L 63/20* (2013.01)

(58) Field of Classification Search
CPC . H04L 29/08972; H04L 63/102; H04W 4/24; H04W 80/04; H04W 28/24; H04M 15/8016
USPC .......... 370/328, 329, 401, 235; 709/223, 224
See application file for complete search history.

(56) References Cited

U.S. PATENT DOCUMENTS

| 5,151,899 A | 9/1992 | Thomas et al. |
| 5,371,731 A | 12/1994 | Pratt et al. |

(Continued)

FOREIGN PATENT DOCUMENTS

| EP | 1250022 | 10/2002 |
| EP | 1619917 | 1/2006 |

(Continued)

OTHER PUBLICATIONS

User Agent Profile (UAProf) Specification, Wireless Application Group, Wireless Application Protocol Forum, version 10, Nov. 1999.*

(Continued)

*Primary Examiner* — Benjamin Lamont
(74) *Attorney, Agent, or Firm* — Patent Capital Group

(57) ABSTRACT

A method is provided in one example and includes receiving a request to initiate a communication flow associated with a subscriber and identifying one or more parameters to be monitored for the communication flow. The method further includes extracting one or more bits from packets associated with the communication flow; the bits are used to determine an operating system associated with the communication flow. A policy decision can be executed for the communication flow based on the operating system associated with the communication flow. In more specific examples, the bits are sent to a next destination in response to a threshold being reached for at least one of the parameters. The parameters can be associated a volume parameter or a time parameter. The policy decision could include blocking traffic associated with the subscriber, initiating billing, redirecting the communication, managing a quality of service level for the communication flow, etc.

20 Claims, 4 Drawing Sheets

(51) Int. Cl.
  *H04L 12/801* (2013.01)
  *H04L 12/813* (2013.01)
  *H04L 29/06* (2006.01)

(56) References Cited

U.S. PATENT DOCUMENTS

| | | | |
|---|---|---|---|
| 5,898,713 | A | 4/1999 | Melzer et al. |
| 6,496,516 | B1 | 12/2002 | Dabecki et al. |
| 6,522,880 | B1 | 2/2003 | Verma et al. |
| 6,643,621 | B1 | 11/2003 | Dodrill et al. |
| 6,654,792 | B1 | 11/2003 | Verma et al. |
| 6,684,256 | B1 | 1/2004 | Warrier et al. |
| 6,728,266 | B1 * | 4/2004 | Sabry et al. ............... 370/468 |
| 6,829,242 | B2 | 12/2004 | Davison et al. |
| 6,839,767 | B1 | 1/2005 | Davies et al. |
| 6,862,624 | B2 | 3/2005 | Colby et al. |
| 6,917,592 | B1 | 7/2005 | Ramankutty et al. |
| 6,922,411 | B1 | 7/2005 | Taylor |
| 6,968,389 | B1 | 11/2005 | Menditto et al. |
| 7,317,693 | B1 * | 1/2008 | Roesch et al. ............ 370/252 |
| 7,366,189 | B2 | 4/2008 | Davison et al. |
| 7,426,202 | B2 | 9/2008 | Warrier et al. |
| 7,447,765 | B2 * | 11/2008 | Aerrabotu et al. ......... 709/224 |
| 7,496,662 | B1 | 2/2009 | Roesch et al. |
| 7,502,836 | B1 | 3/2009 | Menditto et al. |
| 7,522,521 | B2 | 4/2009 | Bettink et al. |
| 7,610,330 | B1 | 10/2009 | Quinn et al. |
| 7,673,072 | B2 | 3/2010 | Boucher et al. |
| 7,742,399 | B2 | 6/2010 | Pun |
| 7,768,983 | B2 | 8/2010 | Nylander et al. |
| 7,792,113 | B1 | 9/2010 | Foschiano et al. |
| 7,808,919 | B2 | 10/2010 | Nadeau et al. |
| 7,827,256 | B2 | 11/2010 | Phillips et al. |
| 7,856,512 | B2 | 12/2010 | Hilla et al. |
| 7,885,248 | B2 | 2/2011 | Harper et al. |
| 7,885,260 | B2 | 2/2011 | Paul et al. |
| 7,890,636 | B2 | 2/2011 | Grayson et al. |
| 7,925,709 | B1 | 4/2011 | Ben-Yoseph et al. |
| 7,926,071 | B2 * | 4/2011 | Stephens et al. ........... 719/328 |
| 7,929,442 | B2 | 4/2011 | Connor et al. |
| 7,990,993 | B1 | 8/2011 | Ghosh et al. |
| 8,018,866 | B1 | 9/2011 | Kasturi et al. |
| 8,086,253 | B1 * | 12/2011 | Kalamkar et al. ......... 455/466 |
| 8,279,776 | B1 | 10/2012 | Everson et al. |
| 8,339,959 | B1 | 12/2012 | Moisand et al. |
| 2002/0046264 | A1 | 4/2002 | Dillon et al. |
| 2002/0053029 | A1 * | 5/2002 | Nakamura et al. ........ 713/201 |
| 2003/0028433 | A1 | 2/2003 | Merriman et al. |
| 2003/0028644 | A1 | 2/2003 | Maguire et al. |
| 2003/0039237 | A1 | 2/2003 | Forslow |
| 2003/0058872 | A1 | 3/2003 | Berggreen et al. |
| 2003/0097481 | A1 | 5/2003 | Richter |
| 2004/0054925 | A1 | 3/2004 | Etheridge et al. |
| 2004/0088385 | A1 | 5/2004 | Blanchet et al. |
| 2004/0224678 | A1 | 11/2004 | Dahod et al. |
| 2004/0236855 | A1 | 11/2004 | Peles |
| 2005/0013253 | A1 | 1/2005 | Lindskog et al. |
| 2005/0025152 | A1 | 2/2005 | Georgiou et al. |
| 2005/0058153 | A1 | 3/2005 | Santhoff et al. |
| 2005/0074005 | A1 | 4/2005 | Okuno |
| 2005/0088974 | A1 | 4/2005 | Savoor et al. |
| 2005/0091371 | A1 | 4/2005 | Delegue et al. |
| 2005/0096016 | A1 * | 5/2005 | Tervo et al. ............. 455/414.1 |
| 2005/0120091 | A1 * | 6/2005 | Casais et al. .............. 709/217 |
| 2005/0147069 | A1 | 7/2005 | Rink et al. |
| 2005/0239473 | A1 | 10/2005 | Pan et al. |
| 2005/0246346 | A1 | 11/2005 | Gerdes et al. |
| 2005/0286504 | A1 | 12/2005 | Kwon |
| 2006/0018328 | A1 | 1/2006 | Mody et al. |
| 2006/0029084 | A1 * | 2/2006 | Grayson ................... 370/401 |
| 2006/0058021 | A1 | 3/2006 | Fox et al. |
| 2006/0098573 | A1 | 5/2006 | Beer et al. |
| 2006/0164992 | A1 | 7/2006 | Brown et al. |
| 2006/0222086 | A1 | 10/2006 | Frye |
| 2006/0224750 | A1 | 10/2006 | Davies et al. |
| 2006/0234678 | A1 | 10/2006 | Juitt et al. |
| 2006/0256722 | A1 | 11/2006 | Taha et al. |
| 2006/0268901 | A1 | 11/2006 | Choyi et al. |
| 2006/0291388 | A1 | 12/2006 | Amdahl et al. |
| 2007/0014245 | A1 | 1/2007 | Aloni et al. |
| 2007/0027992 | A1 | 2/2007 | Judge et al. |
| 2007/0067839 | A1 * | 3/2007 | Hamada et al. ............... 726/22 |
| 2007/0078955 | A1 * | 4/2007 | Siliquini et al. ............. 709/220 |
| 2007/0097983 | A1 | 5/2007 | Nylander et al. |
| 2007/0101421 | A1 | 5/2007 | Wesinger et al. |
| 2007/0105568 | A1 | 5/2007 | Nylander et al. |
| 2007/0116019 | A1 | 5/2007 | Cheever et al. |
| 2007/0116020 | A1 | 5/2007 | Cheever et al. |
| 2007/0201383 | A1 | 8/2007 | Ong et al. |
| 2007/0208820 | A1 | 9/2007 | Makhervaks et al. |
| 2007/0243872 | A1 | 10/2007 | Gallagher et al. |
| 2007/0253328 | A1 | 11/2007 | Harper et al. |
| 2007/0271453 | A1 | 11/2007 | Pohja et al. |
| 2007/0298848 | A1 | 12/2007 | Babin |
| 2008/0010354 | A1 | 1/2008 | Sasaki et al. |
| 2008/0026740 | A1 | 1/2008 | Netanel |
| 2008/0045267 | A1 | 2/2008 | Hind et al. |
| 2008/0114862 | A1 | 5/2008 | Moghaddam et al. |
| 2008/0133518 | A1 | 6/2008 | Kapoor et al. |
| 2008/0137541 | A1 | 6/2008 | Agarwal et al. |
| 2008/0147837 | A1 | 6/2008 | Klein et al. |
| 2008/0162637 | A1 | 7/2008 | Adamczyk et al. |
| 2008/0176582 | A1 | 7/2008 | Ghai et al. |
| 2008/0177880 | A1 | 7/2008 | Ginis |
| 2008/0188223 | A1 | 8/2008 | Vesterinen et al. |
| 2008/0298309 | A1 | 12/2008 | Dahod et al. |
| 2008/0301254 | A1 | 12/2008 | Bestler |
| 2008/0310404 | A1 | 12/2008 | Valme et al. |
| 2008/0316980 | A1 | 12/2008 | Ahlen et al. |
| 2009/0017864 | A1 | 1/2009 | Keevill et al. |
| 2009/0061821 | A1 | 3/2009 | Chen et al. |
| 2009/0061873 | A1 | 3/2009 | Bao et al. |
| 2009/0067417 | A1 | 3/2009 | Kalavade et al. |
| 2009/0086742 | A1 | 4/2009 | Ghai et al. |
| 2009/0089447 | A1 | 4/2009 | Balachandran et al. |
| 2009/0092136 | A1 | 4/2009 | Nazareth et al. |
| 2009/0098872 | A1 | 4/2009 | Deshpande et al. |
| 2009/0109849 | A1 | 4/2009 | Wood et al. |
| 2009/0109982 | A1 | 4/2009 | Batz et al. |
| 2009/0129271 | A1 | 5/2009 | Ramankutty et al. |
| 2009/0156213 | A1 | 6/2009 | Spinelli et al. |
| 2009/0161680 | A1 | 6/2009 | Ishikawa et al. |
| 2009/0164597 | A1 | 6/2009 | Shuster |
| 2009/0207759 | A1 | 8/2009 | Andreasen et al. |
| 2009/0215438 | A1 | 8/2009 | Mittal et al. |
| 2009/0254658 | A1 | 10/2009 | Kamikura et al. |
| 2009/0262682 | A1 | 10/2009 | Khetawat et al. |
| 2009/0279522 | A1 | 11/2009 | Leroy et al. |
| 2009/0286510 | A1 | 11/2009 | Huber et al. |
| 2009/0307746 | A1 * | 12/2009 | Di et al. ..................... 726/1 |
| 2010/0010991 | A1 | 1/2010 | Joshi |
| 2010/0067462 | A1 | 3/2010 | Beser et al. |
| 2010/0077102 | A1 | 3/2010 | Lim et al. |
| 2010/0082787 | A1 | 4/2010 | Kommula et al. |
| 2010/0091653 | A1 | 4/2010 | Koodli et al. |
| 2010/0091775 | A1 | 4/2010 | Yamamoto |
| 2010/0103871 | A1 | 4/2010 | Mooney et al. |
| 2010/0124933 | A1 | 5/2010 | Chowdhury et al. |
| 2010/0131646 | A1 | 5/2010 | Drako |
| 2010/0174829 | A1 | 7/2010 | Drako |
| 2010/0186064 | A1 * | 7/2010 | Huang et al. .................. 726/1 |
| 2010/0195640 | A1 | 8/2010 | Park et al. |
| 2010/0278070 | A1 | 11/2010 | Melia et al. |
| 2010/0291897 | A1 | 11/2010 | Ghai et al. |
| 2011/0021192 | A1 | 1/2011 | Grayson et al. |
| 2011/0021196 | A1 | 1/2011 | Grayson et al. |
| 2011/0058479 | A1 | 3/2011 | Chowdhury et al. |
| 2011/0069663 | A1 | 3/2011 | Shu et al. |
| 2011/0075557 | A1 | 3/2011 | Chowdhury et al. |
| 2011/0075675 | A1 | 3/2011 | Koodli et al. |
| 2011/0076985 | A1 | 3/2011 | Chami et al. |
| 2011/0145103 | A1 | 6/2011 | Ljunggren et al. |
| 2011/0145111 | A1 | 6/2011 | Ljundren et al. |
| 2011/0182249 | A1 | 7/2011 | Yang et al. |

(56) References Cited

U.S. PATENT DOCUMENTS

| | | |
|---|---|---|
| 2011/0185049 A1 | 7/2011 | Atreya et al. |
| 2011/0225284 A1 | 9/2011 | Savolainen |
| 2011/0235546 A1 | 9/2011 | Horn et al. |
| 2011/0235595 A1 | 9/2011 | Mehta et al. |
| 2011/0295942 A1 | 12/2011 | Raghunath et al. |
| 2012/0002543 A1 | 1/2012 | Dighe et al. |
| 2012/0076120 A1 | 3/2012 | Kovvali et al. |
| 2012/0082073 A1 | 4/2012 | Andreasen et al. |
| 2012/0082093 A1 | 4/2012 | Andreasen et al. |
| 2012/0082094 A1 | 4/2012 | Andreasen et al. |
| 2012/0082132 A1 | 4/2012 | Andreasen et al. |
| 2012/0082146 A1 | 4/2012 | Andreasen et al. |
| 2012/0082161 A1 | 4/2012 | Leung et al. |
| 2012/0184258 A1 | 7/2012 | Kovvali et al. |
| 2012/0224536 A1 | 9/2012 | Hahn et al. |
| 2013/0003741 A1 | 1/2013 | Singh et al. |
| 2013/0041934 A1 | 2/2013 | Annamalaisami et al. |
| 2013/0058274 A1 | 3/2013 | Scherzer et al. |
| 2013/0258963 A1 | 10/2013 | Mihaly et al. |

FOREIGN PATENT DOCUMENTS

| | | |
|---|---|---|
| EP | 1978685 | 10/2008 |
| WO | WO 92/07438 | 4/1992 |
| WO | WO 92/14327 | 8/1992 |
| WO | WO2005/015825 | 2/2005 |
| WO | WO 2009/089455 | 7/2009 |
| WO | WO2009/132700 | 11/2009 |
| WO | WO2011/062745 | 5/2011 |
| WO | WO2011/062746 | 5/2011 |

OTHER PUBLICATIONS

U.S. Appl. No. 12/621,114, filed Nov. 18, 2009, entitled "System and Method for Inspecting Domain Name System Flows in a Network Environment," Inventor(s): Robert Batz et al.

Cisco Systems, Inc., Configuring URL Routing (L5 Routing) on the CSS 11000 and 11500, © 1992-2006; Document ID: 25999; 5 pages http://www.cisco.com/en/US/products/hw/contnetw/ps792/products_configuration_example09186a00801c0dbc.shtml.

Cisco Systems, Inc., "Cisco Application-Oriented Networking," © 1992-2006; 10 pages http://www.cisco.com/en/US/prod/collateral/modules/ps6438/product_data_sheet0900aecd802c1f9c.html.

U.S. Appl. No. 12/624,020, filed Nov. 23, 2009, entitled "System and Method for Providing a Sequence Numbering Mechanism in a Network Environment," Inventor(s): Walter Dixon et al.

U.S. Appl. No. 12/642,790, filed Dec. 19, 2009, entitled "System and Method for Managing Out of Order Packets in a Network Environment," Inventor(s): Walter Dixon et al.

U.S. Appl. No. 12/642,791, filed Dec. 19, 2009, entitled "System and Method for Providing Subscriber Aware Routing in a Network Environment," Inventor(s): Shmuel Shaffer.

PCT Notification of Transmittal (1 page) of the International Search Report (4 pages) and the Written Opinion of the International Searching Authority, or the Declaration (6 pages) mailed Mar. 1, 2011 for PCT/US2010/054834.

Cisco Systems, Inc. "Cisco NAC Appliance—Clean Access Server Installation and Configuration Guide, Rel. 4.6(1)," Jul. 2009, 3 pages http://www.cisco.com/en/US/docs/security/nac/appliance/configuration_guide/461/cas/cas461ug.pdf.

Cisco Systems, Inc., "Cisco NAC Appliance—Clean Access Manager Installation and Configuration Guide," Jul. 2009, 5 pages http://www.cisco.com/en/US/docs/security/nac/appliance/configuration_guide/461/cam/cam461ug.pdf.

"$3^{rd}$ Generation Partnership project; Technical Specification Group Core Network and Terminals; Policy and Charging Control over Gx reference point(Release 9)," 3GPP Standard; 3GPP TS 29.212, $3^{rd}$ Generational partnership Project (3GPP), Mobile Competence Centre; 650, Route Des Lucioles; F-06921 Sophia-Antipolis Cedex; France, No. V9.0.0, Sep. 1, 2009; 92 pages.

PCT Notification of Transmittal (1 page) of the International Search Report (4 pages) and the Written Opinion of the International Searching Authority, or the Declaration (7 pages) mailed Feb. 8, 2011 for PCT/US2010/054838.

"3GPP TS 23.203 V9.2.0 (Sep. 2009) Technical Specification $3^{rd}$ Generation Partnership project; Technical Specification Group Services and System Aspects; Policy and Charging Control Architecture (Release 9)," 3GPP TS 23.203 V9.2.0, vol. 23, 203, No. V9.2.0; Sep. 1, 2009, 120 pages URL:ftp://ftp.3.gpp.org/specs/archive/23_series/23.203/.

EPO Aug. 22, 2012 Response to Communication re Rules 161(1) and 162 EPC from European Application No. 10779130; 8 pages.

U.S. Appl. No. 12/984,034, filed Jan. 4, 2011, entitled "System and Method for Exchanging Information in a Mobile Wireless Network Environment," Inventors: Gary B. Mahaffey, et al.

U.S. Appl. No. 13/159,906, filed Jun. 14, 2011, entitled "Selective Packet Sequence Acceleration in a Network Environment," Inventor(s): Bhagatram Janarthanan et al.

U.S. Appl. No. 13/160,189, filed Jun. 14, 2011, entitled "Preserving Sequencing During Selective Packet Acceleration in a Network Environment," Inventor(s): Bhagatram Janarthanan et al.

U.S. Appl. No. 13/160,344, filed Jun. 14, 2011, entitled "Accelerated Processing of Aggregate Data Flows in a Network Environment," Inventor(s): Imnaz Meher Jilani et al.

U.S. Appl. No. 13/160,426, filed Jun. 14, 2011, entitled "Selective Packet Sequence Acceleration in a Network Environment," Inventor(s): Bhagatram Janarthanan.

3GPP TS.23.203 v.11.3.0 Technical Specification—"3rd Generation Partnership Project; Technical Specification Group Services and System Aspects; Policy and Charging control architecture (Release 11)," Sep. 2011; 167 pages.

3GPP TS.23.401 v.10.5.0 Technical Specification—"3rd General Partnership Project; Technical Specification Group Services and System Aspects: General Packet Radio Service (GPRS) enhancements for Evolved Universal Terrestrial Radio Access Network (E-UTRAN) access (Release 10)," Sep. 2011, 284 pages.

3GPP TS 23.236 v.10.0.0 Technical Specification—"3rd General Partnership Project; Technical Specification Group Services and Systems Aspects; Intra-Domain Connection of Radio Access Network (RAN) Nodes to Multiple Cor Network (CN) Nodes (Release 10)," Mar. 2010, 39 pages.

Chowdhury, K. "Fast Handoff Support for HRPD," 3rd Generation Partnership Project 2, 3GPP2, Apr. 24, 2006.

Chowdhury, K. "Network-Based Layer 3 Connectivity and Mobility Management for IPv6," draft-chowdbury-netmip6-01.txt, Network Working Group Internet Draft, Sep. 8, 2006, 20 pages http://tools.ietf.org/html/draft-chowdbury-netmip6-01.

Chowdhury, K., "Network Based L3 Connectivity and Mobility Management for IPv4," draft-chowdbury-netmip4-001.tt, Feb. 25, 2006; 16 pages http://tools.ietf.org/html/draft-chowdbury-netmip4-00.

Devarapalli, V., et al., "Proxy Mobile IPv6 and Mobil IPv6 Interworking," draft-devarapalli-netlmm-pmipv6-mipv6-00.txt, NETLMM Working Group Internet Draft, Apr. 10 2007; 9 pages http://tools,ietf.org/html/draft-devarapalli-netlmm-pmipv6-mipv6-00.

Lior, A., et al., "Mobile IP Key Derivation using EAP," draft-lior-mipkeys-eap-00, Network Working Group, Feb. 25, 2006; 17 pages http://tools.ietf.org/html/draft-lior-mipkeys-eap-00.

Navali, J., et al., "IPv6 over Network based Mobile IPv4," draft-navali-ip6-over-netmip4-00.txt, Network Working Group, Feb. 25, 2006; 20 pages http://tools.ietf.org/html/draft-navali-ip6-over-netmip4-00.

PCT May 31, 2012 International Preliminary Report on Patentability and Written Opinion of the International Searching Authority (8 pages) for PCT/US2010/054834.

PCT May 30, 2012 International Preliminary Report on Patentability and Written Opinion of the International Searching Authority (8 pages) for PCT/US2010/054838.

Ericsson, Tdoc S2-000888; "SGSN decomposition," Document for discussion; R000 Architecture; 3GPP TSG SA2 Meeting #13; Berlin, May 22-26, 2000, 13 pages; http://www.3gpp.org/ftp/tsg_sa/WG2_Arch/TSGS2_13/tdocs/S2-000888.zip.

(56) References Cited

OTHER PUBLICATIONS

3GPP TS 23.261 v.10.1.0 Technical Specification—3GPP Organizational Partners, 3rd Generation Partnership Project; Technical Specification Group Services and System Aspects; IP flow mobility and seamless Wireless Local Area Network (WLAN) offload; Stage 2 (Release 10); © 2010, 22 pages; http://www.3gpp.org.
3GPP TR 23.829 v.10.0—3GPP Organizational Partners, 3rd Generation Partnership Project; Technical Specification Group Services and System Aspects; Local IP Access and Selected IP Traffic Offload (LIPA-SIPTO) (Release 10); 3GPP TR 23.829 V10.0.0 (Mar. 2011) © 2011, 43 pages; http://www.3gpp.org.
3GPP TR 25.820 v8.0.0 (Mar. 2008), 3rd Generation Partnership Project; Technical Specification Group Radio Access Networks; 3G Home NodeB Study Item Technical Report (Release 8); http://www.3gpp.org, 2008. 37 pages.
3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TS 22.011 v8.4.1 (Jun. 2008), 3rd Generation Partnership Project; Technical Specification Group Services and System Aspects; Service accessibility (Release 8), Global System for Mobile Communications, http://www/3gpp.org, 2008. 25 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.
3GPP TS 25.411 v7.1.0 (Sep. 2007); 3rd Generation Partnership Project; Technical Specification Group Radio Access Network; UTRAN Iu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007. 359 pages.
3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
EPO Oct. 1, 2013 Communication from European Application Serial No. 10779129.5.
"Stoke Mobile Data Offload Solution Brief," © 2009 Stoke, Inc.; Aug. 2009, 4 pages; [Retrieved and printed Nov. 14, 2013] stoke.com/GetFile.asp?f=a08fed265abc46434edf6763307c1078.
U.S. Appl. No. 14/260,387, filed Apr. 24, 2014, entitled "System and Method for Managing Out of Order Packets in a Network Environment," Inventor(s): Walter Dixon et al.
U.S. Appl. No. 14/257,098, filed Apr. 21, 2014, entitled "Accelerated Processing of Aggregate Data Flows in a Network Environment," Inventor(s): Imnaz Meher Jilani et al.
U.S. Appl. No. 14/257,131, filed Apr. 21, 2014, entitled "Selective Packet Sequence Acceleration in a Network Environment," Inventor(s): Bhagatram Janarthanan.
PRC Apr. 3, 2014 SIPO First Office Action from Chinese Application No. 201080051408.1.
PRC Dec. 12, 2014 SIPO Second Office Action from Chinese Application No. 201080051408.1, Dec. 12, 2014.

\* cited by examiner

SYSTEM AND METHOD FOR REPORTING PACKET CHARACTERISTICS IN A NETWORK ENVIRONMENT

TECHNICAL FIELD

This disclosure relates in general to the field of communications and, more particularly, to reporting packet characteristics in a network environment.

BACKGROUND

Networking architectures have grown increasingly complex in communication environments. As the subscriber base of end users increases and/or becomes mobile, proper routing and efficient management of communication sessions and data flows becomes critical. Typically, subscribers seek to access content from various locations in the network. Subscribers may be provided connectivity or services based on some type of policy or agreement that involves a service provider. The service provider relationship commonly dictates the terms under which subscribers operate in the network. The ability to properly manage policies and financial commitments for the subscriber presents a significant challenge to system designers, component manufacturers, network operators, and system administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a request to initiate a communication flow associated with a subscriber and identifying one or more parameters to be monitored for the communication flow. The method further includes extracting one or more bits from packets associated with the communication flow; the bits can be used to determine an operating system associated with the communication flow. A policy decision can be executed for the communication flow based on the operating system associated with the communication flow. In more specific examples, the bits are sent to a next destination in response to a transmission control protocol (TCP) signature trigger being matched. The policy decision could include blocking traffic associated with the subscriber, initiating billing for the communication flow, redirecting the communication flow to a next destination, managing a quality of service level for the communication flow, etc. In more particular embodiments, the bits are part of a SYN packet (e.g., within a TCP header, a packet option, a packet flag, a TCP field, etc.).

Example Embodiments

Figure 1:
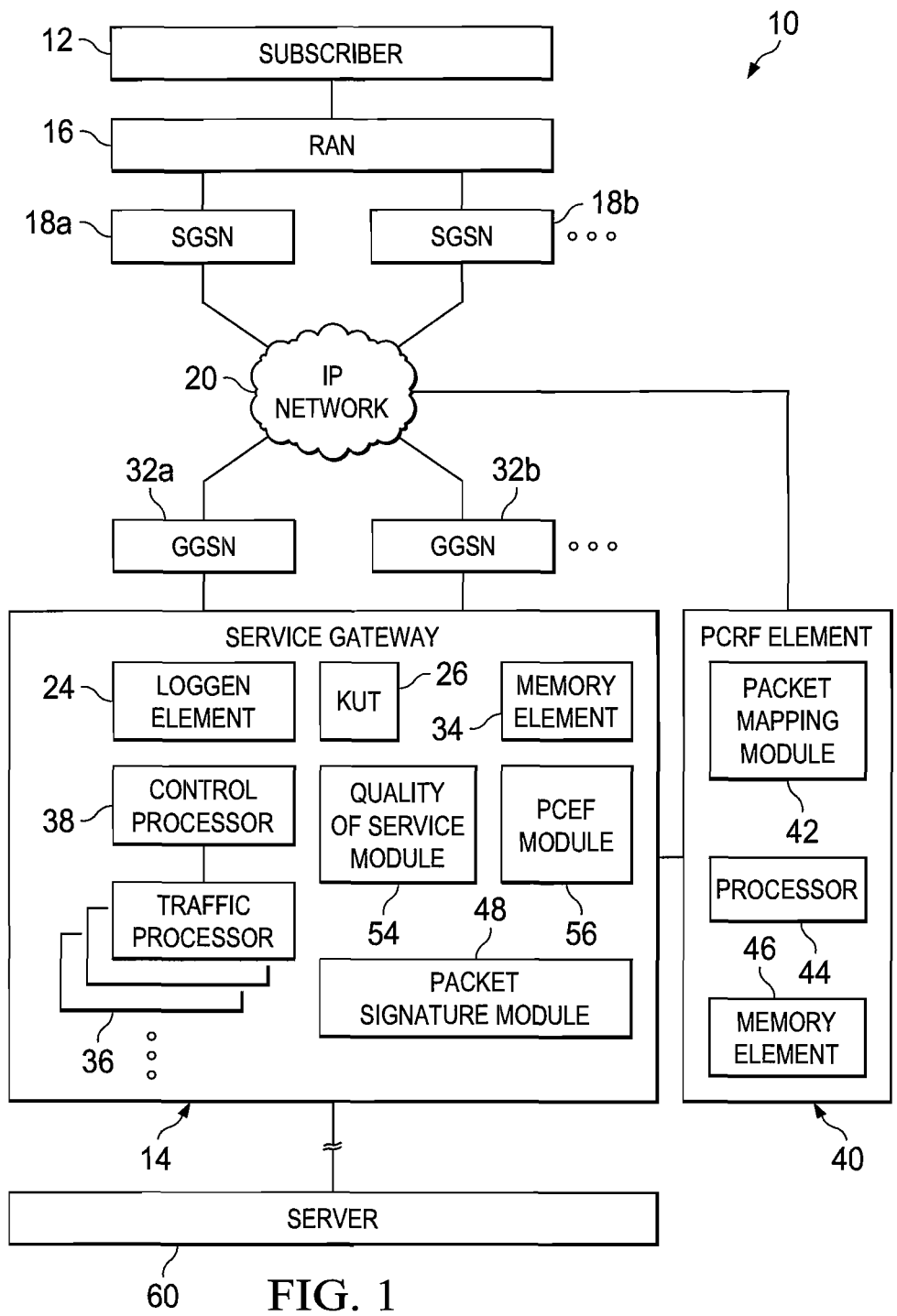
FIG. 1 is a simplified block diagram of a communication system for reporting packet characteristics in a network environment in accordance with one embodiment of the present disclosure.

Turning to FIG. 1, FIG. 1 is a simplified block diagram of a communication system 10 for reporting packet characteristics in a network environment. FIG. 1 may include a subscriber 12, a service gateway 14, a radio access network (RAN) 16, multiple serving general packet radio service (GPRS) support nodes (SGSNs) 18a and 18b, and an Internet protocol (IP) network 20. Additionally, communication system 10 may include multiple gateway GPRS support nodes (GGSNs) 32a and 32b. In addition, service gateway 14 may include a loggen element 24, a known user table (KUT) 26, and multiple traffic processors 36, which have a logical connection to a control processor 38. Service gateway 14 may additionally include a packet signature module 48, a quality of service (QoS) module 54, a policy control enforcement function (PCEF) module 56, and a memory element 34. Communication system 10 may also include a policy and charging rules function (PCRF) element 40, which includes a packet mapping module 42, a processor 44, and a memory element 46. Additionally, communication system 10 includes a server 60, which may provide content or services sought by subscriber 12.

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs. Communication system 10 may be generally configured or arranged to represent a 2G, a 2.5G, or a 3 G communication architecture applicable to a Global System for Mobile (GSM) environment in accordance with a particular embodiment of the present disclosure. Communication system 10 may also be configured to operate with any version of any suitable GPRS tunneling protocol.

For purposes of illustrating certain example techniques of communication system 10, it is important to understand the communications that may be traversing the network and which can offer clues about the devices being employed by a given subscriber. The following foundational information may be viewed as a basis from which the present disclosure may be properly explained. Service providers would like to be able to identify the source operating system (OS) for subscriber devices on the network. Once the operating system is known, service providers can identify which devices are attached to their network and, with that information, control policies associated with particular subscribers. A problem surfaces when subscribers latch onto a network with various types of devices: some of which may consume an inappropriate amount of bandwidth. Stated in different terms, some devices that are unauthorized may attach to the service provider's network. In more specific instances, certain devices may fall outside a user agreement between the subscriber and the service provider. In one sense, subscribers can circumvent policies by changing their devices at the point of attachment to the network. For example, a mobile service provider may have an agreement that only accommodates mobile phones for the network. Certain subscribers may choose to attach laptops, desktop machines, or various other devices to the network and these devices (e.g., per the terms of the policy) should not be provided with network connectivity.

Communication system 10 can resolve this issue by identifying the operating system associated with incoming flows. This can be achieved by evaluating packets being sent from particular subscriber devices. Through analyzing packets, the underlying operating system can reveal data indicative of the particular device being employed by the subscriber. For example, certain transmission control protocol (TCP) headers may be used to identify a particular operating system (e.g., WINDOWS, Linux, MAC, etc.). In other instances, specific packet options, flags, or IP header information may be identified in order to discern an associated operating system. Any number of additional characteristics may be gleaned in order to make an intelligent assessment of a given operating system. Thus, by understanding certain characteristics of particular operating systems, an intelligent identification of devices can be made based on corresponding packet flows. Some of these possible packet characteristics are discussed below and, further, illustrated in an example table of FIG. 4.

In one example implementation of communication system 10, attribute-value pairs (AVPs) can be used for various types of triggers, which can be set (i.e., identified) to monitor subscriber flows for particular events. Examples of potential triggers (i.e., parameters) can be associated with per-user volume thresholds, per-user time thresholds, or any other suitable characteristic associated with the flow. The AVPs can be modeled similar to charging rule trigger AVPs, which can take various forms. In one example embodiment, KUT 26 can provide an application program interface (API) for determining if the parameters (e.g., criteria) for generating a TCP signature message are present. This includes monitoring the thresholds associated with these parameters. If a message is to be generated, the API can also provide a mechanism for extracting the required bytes from the triggering packet. In one example, the activities for TCP signature message generation include: 1) a TCP signature trigger being set for the subscriber; 2) a current packet being received from the subscriber; and 3) the current packet being a TCP packet with the SYN bit set.

In one particular example, the operations outlined herein can apply to a Gx architecture. Gx represents a third generation partnership project (3GPP) Diameter application. In a Gx-enabled network, a Gx reference point can be located between PCRF element 40 and PCEF module 56. The Gx reference point can be used for charging and policy control by applying AVPs relevant to the application. Service gateway 14 can provide policy control via the Gx interface. Before turning to some of the operations of this architecture, a brief discussion is provided about some of the infrastructure of FIG. 1.

Subscriber 12 can be associated with clients, customers, or end users wishing to initiate a communication in communication system 10 via some network. The term 'subscriber' is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. Subscriber 12 may also be inclusive of a suitable interface to the human user, such as a microphone, a display, or a keyboard or other terminal equipment. Subscriber 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Service gateway 14 and PCRF element 40 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, servers, processors, modules, or any other suitable device, component, element, or object operable to exchange information in a network environment. The network elements may include a packet signature module 48 and packet mapping module 42 to support the activities associated with reporting packet signatures associated with particular flows, as outlined herein. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, service gateway 14 and PCRF element 40 include software to achieve (or to foster) the signature reporting operations, as outlined herein in this Specification. Note that in one example, these network elements can have an internal structure (e.g., with a processor, a memory element, etc.) to facilitate some of the operations described herein. In other embodiments, these signature reporting features may be provided externally to these elements or included in some other network device to achieve this intended functionality. Alternatively, service gateway 14 and PCRF element 40 include this software (or reciprocating software) that can coordinate with each other in order to achieve the operations, as outlined herein. In still other embodiments, one or both of these devices may include any suitable algorithms, hardware, software, components, modules, interfaces, or objects that facilitate the operations thereof.

In a Gx-enabled network, service gateway 14 can act as a PCEF, either as part of an enhanced GGSN (eGGSN) node, where service gateway 14 and a GGSN are provided as separate cards in a given network element. Alternatively, service gateway 14 can be configured to operate as a standalone Gi-node, with interoperability from external GGSNs. In eGGSN mode, service gateway 14 can act as a Gx interface endpoint, while the GGSN manages packet data protocol (PDP) contexts. Service gateway 14 and a given GGSN can communicate with each other using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

Service gateway 14 can offer basic Gx support with enhancements for per-user layer 7 rules, dynamic policy loading, and per-user service policies. In a Gi-node mode, a standalone service gateway 14 can act as a Gx interface endpoint. The Gi-node mode can support the same functions as the eGGSN mode. To enable Gx support for a particular subscriber, service gateway 14 can define a user profile and associate that profile with the subscriber. For example, the user profile can enable Gx for associated subscribers. The user profile can also define the actions that service gateway 14 can take if a PCRF fails. In addition, the user profile can define the mobile policy control and charging (MPCC) profile to be used by service gateway 14 when sending per-user credit control requests (CCRs) to PCRF element 40.

Service gateway 14 can determine that a user is a Gx user in several ways. For example, a given GGSN can send a RADIUS accounting start request or a RADIUS accounting interim request: both of which can indicate that the user is a Gx user. Alternatively, service gateway 14 can compare the access point name (APN) name in an attribute (e.g., a Called- Station-Id attribute) of the RADIUS accounting start against a configured list of APN names to determine that the user is a Gx user. In regards to dynamic loading of policies, service gateway 14 can dynamically load global contents, maps, policies, billing plans, and services from PCRF element 40. If configured to do so, service gateway 14 can dynamically load policies as it boots up (i.e. preloading of policies). Service gateway 14 also supports exporting the IP and TCP headers from a subscriber TCP SYN (or SYN-ACK) packet to PCRF element 40 via the Gx protocol. PCRF element 40 selectively initiates a per-user TCP signature trigger to request the TCP signature information. In specific embodiments, this relates to identifying a given operating system, as detailed herein. The subscriber can be identified as a Gx user to allow this reporting to PCRF element 40.

RAN 16 is a communication interface between subscriber 12 and SGSNs 18a and 18b. RAN 16 may comprise a base transceiver station and a base station controller in one embodiment. The communication interface provided by RAN 16 may allow data to be exchanged between subscriber 12 and any number of selected elements within communication system 10. RAN 16 may facilitate the delivery of a request packet generated by subscriber 12 and the reception of information sought by subscriber 12. RAN 16 is only one example of a communication interface between subscriber 12 and SGSNs 18a and 18b. Other suitable types of communication interfaces may be used for any appropriate network design and these may be based on specific communication architectures.

SGSNs 18a, 18b, and GGSNs 32a, 32b are communication nodes or elements that cooperate in order to facilitate a communication session involving subscriber 12. GGSNs 32a-b are communication nodes operating in a GPRS environment that may be working in conjunction with multiple SGSNs 18a and 18b to provide a communication medium in a GPRS service network. GGSNs 32a and 32b can provide a GPRS tunneling protocol (GTP), any PDP authentication, authorization, and accounting (AAA) operations, and QoS RAN signaling. GPRS may support multiple internet communication protocols and may enable existing IP, point-to-point protocol (PPP), or any other suitable applications or platforms to operate over a given network.

IP network 20 represents a series of points or nodes of interconnected communication paths for receiving and transmitting packets of information that propagate through communication system 10. IP network 20 offers a communicative interface between subscriber 12 and selected GGSNs 32a-b, and may be any local area network (LAN), wireless local area network (WLAN), metropolitan area network (MAN), wide area network (WAN), virtual private network (VPN), or any other appropriate architecture or system that facilitates communications in a network environment. IP network 20 may implement a UDP/IP connection and use a TCP/IP communication language protocol in particular embodiments of the present disclosure. However, IP network 20 may alternatively implement any other suitable communication protocol for transmitting and receiving data packets within communication system 10.

PCRF element 40 can be configured to initiate the TCP signature trigger using a subscriber credit control answer (CCA) or re-authorization request (RAR) message. Service gateway 14 can report the TCP signature of the next TCP flow in a subscriber credit control request-update (CCR-U) message. After the trigger is set, it can be cleared until it is initiated again by PCRF element 40. In one sense, a trigger being set or armed can mean that PCRF element 40 indicated to service gateway 14 that the next TCP-SYN for a given subscriber should be reported. At this juncture, there is a trigger set, but no TCP-SYN to report. PCRF element 40 is able to effectively disarm the trigger (i.e., disable the mechanism, or unset the feature) if it so chooses. If service gateway 14 sees the TCP-SYN for the subscriber and the trigger is still set, the trigger is disarmed and the TCP-SYN is reported. PCRF element 40 can then choose to set the trigger again to see the next TCP-SYN for the subscriber.

PCRF element 40 can be configured to act as a Diameter server and perform the following functions: 1) use the Gx interface to provision PCC rules to (and remove PCC rules from) PCEF module 56; 2) manage policy control decisions; 3) provide network control regarding the service data flow detection, QoS, and flow-based charging towards PCEF module 56; 4) receive session and media-related information from application functions (AFs); and 5) inform the AFs of traffic plane events.

PCEF module 56 can act as a Diameter client and perform the following functions: 1) use the Gx interface to send traffic plane events to PCRF element 40; 2) enforce policy, handle flow-based charging, control QoS and the handling of user plane traffic; 3) provide service data flow detection, counting for online and offline charging interactions; and 4) report changes in the status of service data flows. In a Gx-enabled network, the PCC rules can be used to: 1) detect a packet that belongs to a service data flow; 2) identify the service to which the service data flow contributes; and 3) provide applicable charging parameters and policy control for a service data flow. PCC rules can be dynamically provisioned by PCRF element 40 to PCEF module 56 over the Gx interface. Dynamic PCC rules can be dynamically generated in PCRF element 40. Dynamic PCC rules can be activated, modified, and deactivated at any time.

Loggen element 24 is a storage element operable to build billing records and communicate the billing records to a billing system based on information provided by KUT 26. Loggen element 24 may also operate to store data for later use and execute all formatting for billing records to be communicated to a billing system. Loggen element 24 may be implemented using hardware, software, or any other suitable element or object operable to store information and to generate a billing record to be communicated to a billing system. Loggen element 24 may generate logging records or billing records and additionally send messages to a billing system element associated with a change in SGSN.

KUT 26 is a data storage element that manages one or more correlations between the ID of subscriber 12 and a corresponding IP address. KUT 26 could be simply part of any memory element within service gateway 14. KUT 26 may also store information relating to billing, previously designated for subscriber 12, and the billing system may be invoked when additional information associated with subscriber 12 is communicated to service gateway 14. KUT 26 may be consulted as additional billing records are created in order to determine that a billing system should receive selected billing records. KUT 26 may also include an application program interface (API) that may be implemented in order to obtain user ID information for an IP address from a data flow.

KUT 26 is provided with the capability of mapping the source IP address (or any other subscriber 12 parameter) to a user ID. The user ID may be obtained from an external database, where appropriate, or any other suitable location. Alternatively, the user ID may be extracted from a RADIUS flow, a TACACS communication flow, a Diameter communication flow, or any other suitable communication protocol flow, communication session, or data exchange. The database may be populated at any suitable time and updated using any suitable mechanism, such as via the sniffing of RADIUS or TACACS flows.

Server 60 can be a web server offering content or services to any subscriber or group of subscribers. For example, server 60 could be any network element associated with www.ESPN.com or www.yahoo.com: both of which could offer content for their end users. Alternatively, server 60 can be any destination, location, or node that is sought to be accessed or used by subscriber 12. Server 60 may provide the requested service/content, or provide a portal, pathway, or gateway to another location that includes the desired data. In other embodiments, server 60 could simply be a data storage location or a processor that can store or deliver content or services to one or more subscribers 12.

Figure 2:
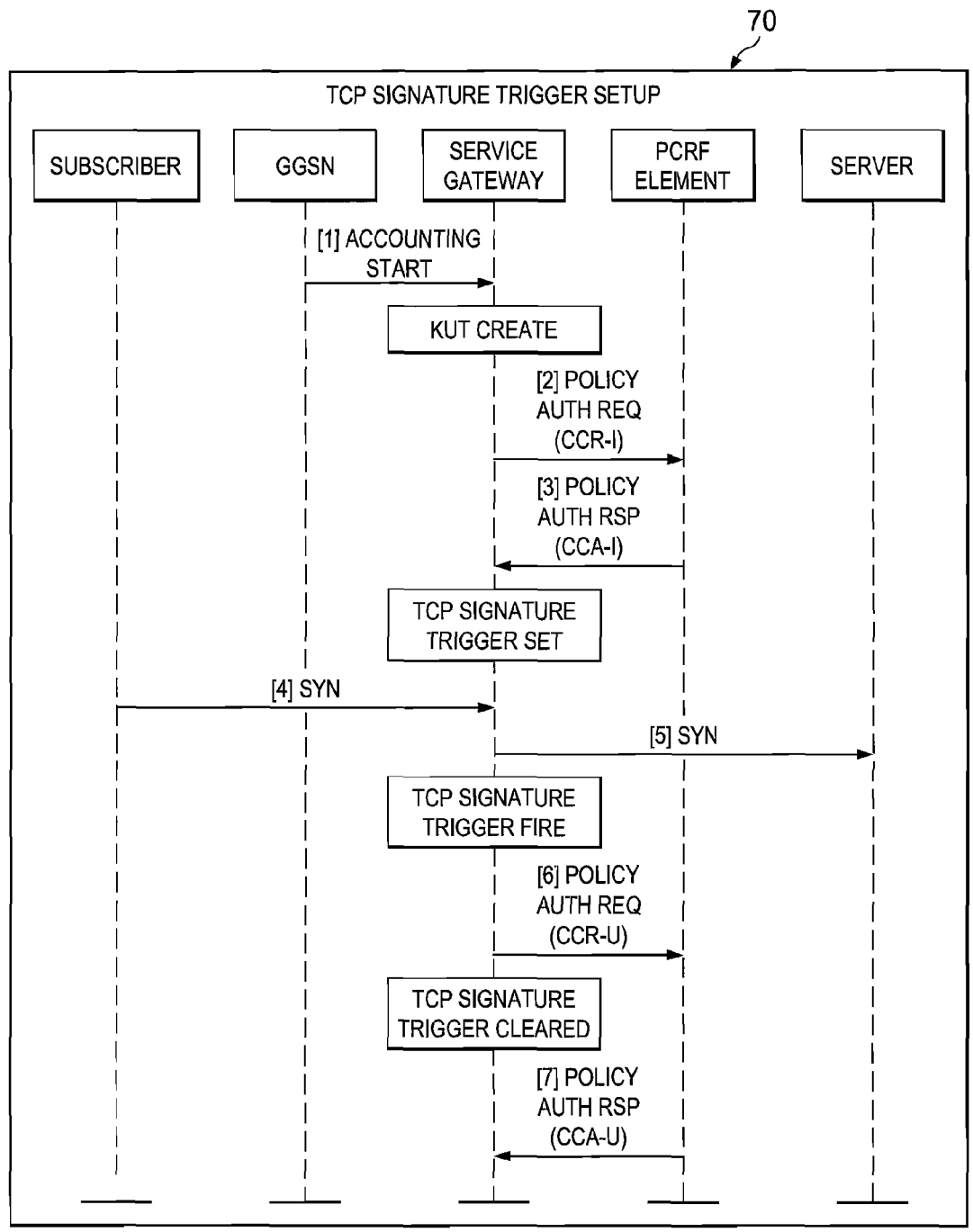
FIG. 2 is a simplified flow diagram illustrating potential operations associated with the communication system.

Turning to FIG. 2, FIG. 2 is a simplified flow diagram 70 illustrating one example activity associated with communication system 10. This particular flow is associated with a TCP signature trigger establishment. Note that in terms of preconditions for this particular flow, a given subscriber can log onto the service provider network and initiate a TCP connection. In this particular example, the subscriber is allowed on the provider network and the subscriber represents a GX user. The subscriber initiates a connection for an allowed service.

In the following flow, the TCP signature trigger can be set (i.e., identified), and the TCP signature AVP can be sent to PCRF element 40. The scenario can be initiated when a subscriber logs into the service provider network and PCRF element 40 sets the TCP signature trigger for the user. At step one (and in the context of a GPRS example), the GGSN sends an accounting start (e.g., RADIUS accounting message) to service gateway 14. At step two, service gateway creates a KUT entry and sends a Policy Auth CCR-Initial to PCRF element 40 with the subscriber information. At step three, PCRF element 40 responds with a Policy Auth CCA-I that includes a trigger for a TCP Signature. Service gateway 14 can set a trigger for the TCP signature on the KUT entry. In one sense, service gateway 14 is indicating that if a certain criteria has been met for particular parameters, the gateway would like to be informed of that event.

Step four reflects the subscriber sending a SYN packet, where service gateway 14 forwards the SYN packet to the server at step five. At step six, the TCP signature trigger is executed and service gateway 14 sends a Policy Auth CCR-U to PCRF element 40 with a new AVP that contains the IP and TCP headers for the SYN packet. The trigger can harvest specific bits from the SYN packets. These bits can be sent back to PCRF element 40, which has the intelligence to map these characteristics to particular operating systems. That logical connection can then be used to make informed policy decisions, which can be sent to service gateway 14. In a general sense, OS-based policy decisions are made at PCRF element 40, where those decisions are executed by service gateway 14.

Note that in a network initiated flow, the TCP signature trigger could be initiated on the SYN-ACK from the subscriber. The IP and TCP headers included in the new AVP can come from the SYN-ACK. The TCP signature trigger is subsequently cleared after step six (e.g., to avoid unnecessarily flooding PCRF element 40 with data). At step seven, PCRF element 40 responds with a Policy Auth CCA-U message. In terms of the trigger, PCRF element 40 can send a specific AVP. For this particular user, service gateway 14 can monitor the flow for subsequent SYN packets. When a subsequent SYN packet is received by service gateway 14, a particular signature can be sent to PCRF element 40 in order to make an informed policy decision. As a general proposition, the trigger is indicating that monitoring should be done in case a particular event occurs for a particular subscriber.

This particular subscriber flow can be further analyzed in step six in order to intelligently identify the operating system being employed by this particular subscriber. This identification could involve some type of backend server, or a consultation with some particular database. In other instances, PCRF element 40 can perform this mapping by itself (e.g., using packet mapping module 42). In one particular example, a backend server is used to intelligently discern the operating system, and that particular server arrangement is discussed below with reference to FIG. 4.

It should also be noted that at step seven, any number of suitable responses could occur. In this particular example, service gateway 14 operates as an enforcement point for the policy decisions being executed by PCRF element 40. Thus, in one example, service gateway 14 is configured to operate as a PCEF element, which constantly interfaces with PCRF element 40 to receive/enforce policy decisions. PCRF element 40 can make its policy decisions based on rules that relate a subscriber to a particular policy, where that policy can be verified, affirmed, validated, or otherwise confirmed through an intelligent identification of the subscriber's operating system.

Where particular flows are not in conformity with the subscriber's policy, any number of responses can occur. For example, based on an identification of the operating system, service gateway 14 may choose to stop services for this particular subscriber. In other instances, service gateway 14 could block particular traffic for this subscriber. Other responses could include a continual monitoring or policing for this particular subscriber. In another instance, a response can trigger additional billing for this particular set of flows. Still other responses could include metering for this particular subscriber, or some type of redirection for this subscriber's flows. Such a redirection could include an indication for additional payment, or an indication that apprises the subscriber of potential charges for these particular flows. Another response could include adjusting, terminating, or otherwise managing a quality of service level for the subscriber's flow(s). Yet another response could include indicating to a corresponding SGSN to terminate this connection.

Figure 3:
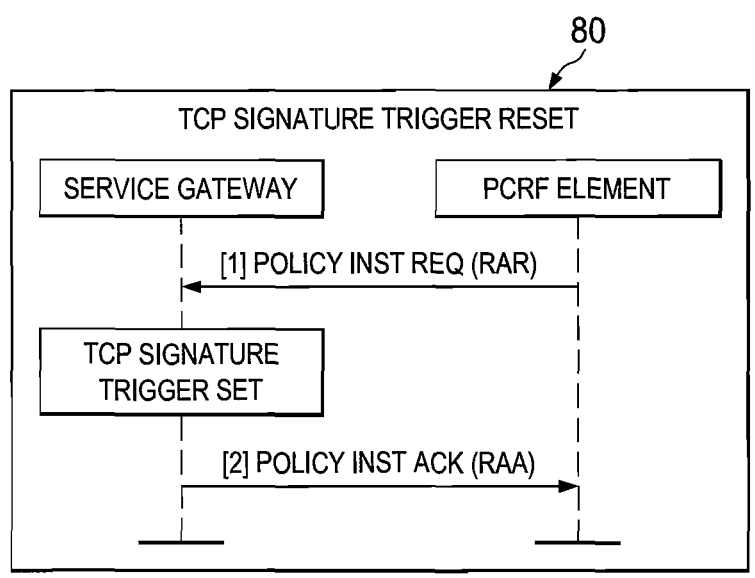
FIG. 3 is a simplified flow diagram illustrating alternative operations associated with the communication system.

FIG. 3 is a simplified flow diagram 80 associated with an example embodiment of the present disclosure. The particular activity being depicted by FIG. 3 is associated with service gateway 14 and PCRF element 40. Note that PCRF element 40 may have some difficulty in identifying a subscriber's operating system. This could result in a small delay, or in other instances, PCRF element 40 may not be able to figure out the operating system for a particular flow. In such an instance, PCRF element 40 can signal this condition to service gateway 14. Thus, in addition to the CCA primitive described previously, there is also an RAR primitive, which is illustrated by FIG. 3.

In one particular example, PCRF element 40 can reinitiate the TCP signature trigger. In this instance, the subscriber has a KUT entry on service gateway 14. For the actual trigger, PCRF element 40 can send a RAR message with the TCP signature trigger. At step one, PCRF element 40 can send a policy install request that includes a TCP signature trigger. At step two, service gateway 14 can enable the TCP signature for the user and respond with a policy install ACK message (e.g., a resource allocation message, a reauthorization answer (RAA) message, etc.). The next TCP flow that is initiated for the user can result in a CCR with the TCP signature AVP. From this point, policy decisions can be made and ultimately enforced, as discussed herein.

Figure 4:
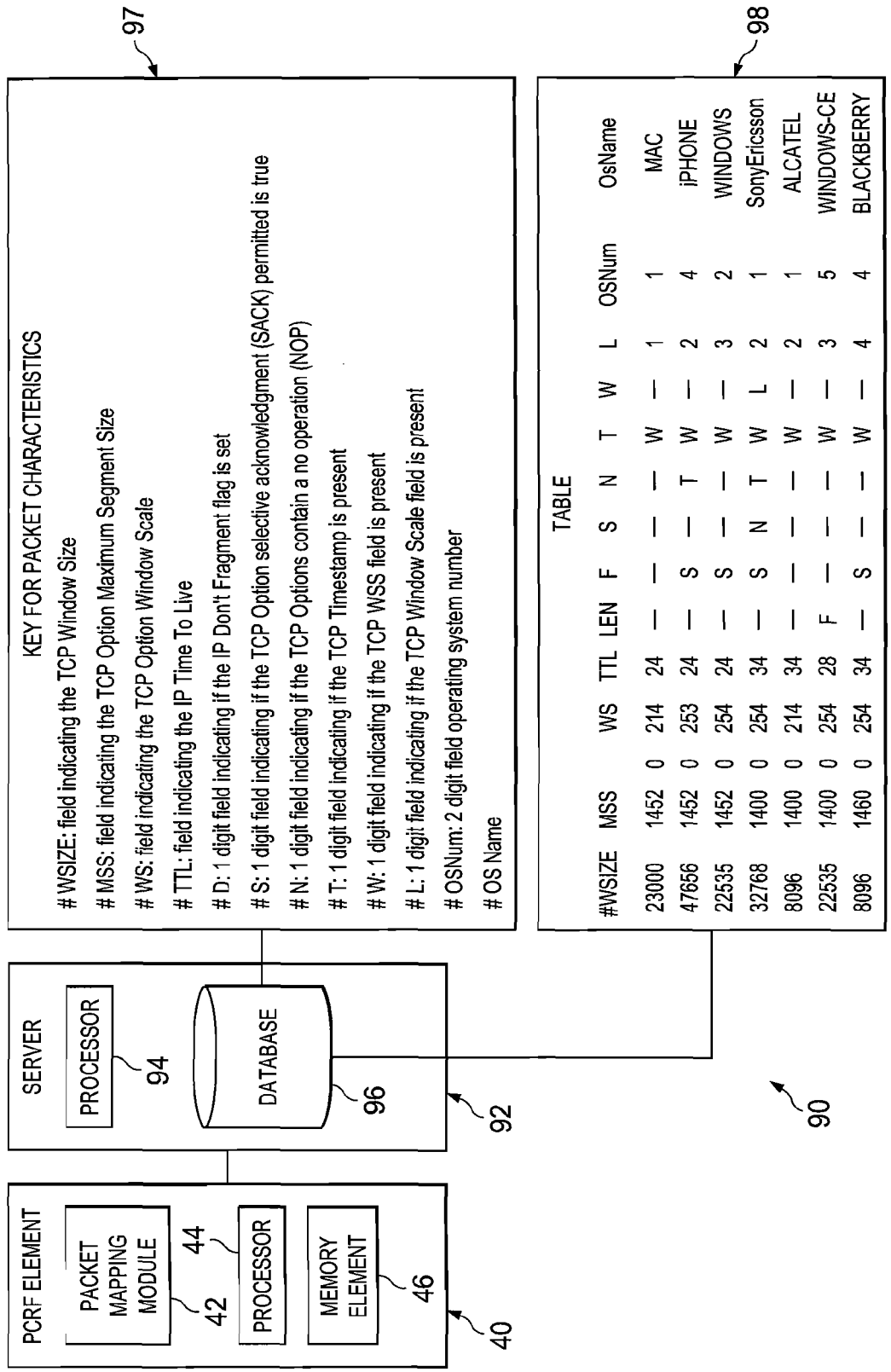
FIG. 4 is a simplified block diagram illustrating an alternative configuration for the communication system.

FIG. 4 is a simplified block diagram of a server configuration 90 associated with an example implementation of communication system 10. FIG. 4 includes PCRF element 40, which is coupled to a server 92 that includes a processor 94 and a database 96. Within database 96 is a key 97, along with a table 98. Key 97 can describe a number of operating system characteristics, which are shown in table 98. For example, key 97 defines particular packet characteristics: some of which may provide an indication of a particular operating system being used (e.g., by the device being used by the subscriber). Some of these potential characteristics can include the TCP window size, the TCP option maximum segment size, the TCP option window scale, the IP time to live, the IP 'do not fragment' flag being set, the TCP option selective acknowledgment (SACK) permitted being true, the TCP option containing a no operation (NOP) indication, a TCP timestamp being present, a TCP WSS field being present, the TCP window scale field being present, an operating system number or name, etc. Any number of additional characteristics may be used in order to determine or to infer that packets are emanating from a particular type of device, processor, endpoint, etc. Aside from determining a given operating system, these packet characteristics can also be used to determine various other conditions, features, or qualities associated with particular communication flows.

In operation, server 92 can receive requests from PCRF element 40. Server 92 can then coordinate with its internal processor 94 and database 96 in order to make an intelligent decision about which operating system is being used by a subscriber. This determination may be influenced by the criteria specified within table 98. More specifically, table 98 may be configured with a number of parameters associated with particular operating systems. These parameters may be matched against incoming packets that are received from PCRF element 40. Once a suitable determination has been made in identifying an operating system, that information can be sent back to PCRF element 40. PCRF element 40 can then make informed policy decisions based on a proper identification of the operating system being employed by a given subscriber.

Note that in certain example implementations, the signature reporting (and operating system identification) functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, service gateway 14 and PCRF element 40 include software in order to achieve the signature reporting (and operating system identification) functions outlined herein. These activities can be facilitated by packet signature module 48 and/or packet mapping module 42. Both service gateway 14 and/or PCRF element 40 can include memory elements for storing information to be used in achieving the intelligent signature reporting and OS identification operations as outlined herein. Additionally, each of these devices may include a processor that can execute software or an algorithm to perform the intelligent signature reporting and OS identification activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, key, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain GGSN components, communication system 10 may be applicable to other protocols and arrangements such as any type of network access server (NAS), GPRS entry point, etc. Moreover, the present disclosure is equally applicable to various cellular and/or wireless technologies including CDMA, Wi-Fi, WiMax, etc. In addition, other example environments that could use the features defined herein include Pico and femto architectures, where an appropriate signature reporting (and operating system identification) would occur for one or more users. Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
   receiving a request to initiate a communication flow;
   mapping a source IP address associated with the communication flow to a subscriber;
   determining a service level for the subscriber;
   identifying one or more parameters to be monitored for the communication flow;
   requesting a synchronization packet in response to a threshold being reached for at least one of the parameters;
   receiving the synchronization packet;
   extracting one or more bits from the synchronization packet, wherein the bits are attribute value pairs;
   determining an operating system associated with the communication flow using the one or more bits from the synchronization packet; and
   executing a policy decision based on the operating system associated with the communication flow and the service level for the subscriber, wherein the policy decision was received from a policy and charging rules function element.

2. The method of claim 1, wherein the bits are sent to a next destination in response to the threshold being reached for at least one of the parameters, and wherein the parameters are associated with a selected one of a volume parameter and a time parameter.

3. The method of claim 1, wherein executing the policy decision includes blocking traffic associated with the subscriber.

4. The method of claim 1, wherein executing the policy decision includes initiating billing for the communication flow.

5. The method of claim 1, wherein executing the policy decision includes redirecting the communication flow to a next destination.

6. The method of claim 1, wherein executing the policy decision includes managing a quality of service level for the communication flow.

7. The method of claim 1, wherein the bits are part of a selected one of a group of elements within the synchronization packet, the group of elements consisting of:
   a) a transmission control protocol (TCP) header;
   b) a packet option;
   c) a packet flag;
   d) a TCP field; and
   e) an IP header field.

8. The method of claim 1, further comprising:
   establishing a trigger used to initiate a request for the synchronization packet, wherein the trigger was received from a policy and charging rules function element.

9. The method of claim 8, wherein the trigger is a per-user volume threshold and the request for the synchronization packet is sent after the per-user volume threshold is met.

10. Logic encoded in one or more tangible media that includes code for execution and when executed by a processor operable to perform operations comprising:
    receiving a request to initiate a communication flow;
    mapping a source IP address associated with the communication flow to a subscriber;
    determining a service level for the subscriber;
    identifying one or more parameters to be monitored for the communication flow;
    requesting a synchronization packet in response to a threshold being reached for at least one of the parameters;
    receiving the synchronization packet;
    extracting one or more bits from the synchronization packet, wherein the bits are attribute value pairs;
    determining an operating system associated with the communication flow using the one or more bits from the synchronization packet; and
    executing a policy decision based on the operating system associated with the communication flow and the service level for the subscriber, wherein the policy decision was received from a policy and charging rules function element.

11. The logic of claim 10, wherein the bits are sent to a next destination in response to the threshold being reached for at least one of the parameters, and wherein the parameters are associated with a selected one of a volume parameter and a time parameter.

12. The logic of claim 10, wherein executing the policy decision includes blocking traffic associated with the subscriber.

13. The logic of claim 10, wherein executing the policy decision includes initiating billing for the communication flow.

14. An apparatus, comprising:
    a memory element configured to store data,
    a processor operable to execute instructions associated with the data, and
    a packet signature module configured to:
       receive a request to initiate a communication flow;
       map a source IP address associated with the communication flow to a subscriber;
       determine a service level for the subscriber;
       identify one or more parameters to be monitored for the communication flow;
       request a synchronization packet in response to a threshold being reached for at least one of the parameters;
       receive the synchronization packet;
       extract one or more bits from the synchronization packet, wherein the bits are attribute value pairs;
       determine an operating system associated with the communication flow using the one or more bits from the synchronization packet; and
       execute a policy decision based on the operating system associated with the communication flow and the service level for the subscriber, wherein the policy decision was received from a policy and charging rules function element.

15. The apparatus of claim 14, wherein the bits are sent to a next destination in response to the threshold being reached for at least one of the parameters, and wherein the parameters are associated with a selected one of a volume parameter and a time parameter.

16. The apparatus of claim 14, further comprising:
a policy control enforcement function (PCEF) module configured to block traffic associated with the subscriber in response to the operating system being determined.

17. The apparatus of claim 16, wherein the PCEF module is further configured to:
redirect the communication flow to a next destination in response to the operating system being determined.

18. The apparatus of claim 14, further comprising:
a quality of service module configured to manage a quality of service level for the communication flow.

19. The apparatus of claim 14, further comprising:
a known user table (KUT) element configured to use an application program interface (API) to determine if one or more thresholds associated with the parameters are reached.

20. The apparatus of claim 14, further comprising:
a policy and charging rules function configured to compare the bits to predetermined operating system characteristics to determine the operating system associated with the communication flow.

\* \* \* \* \*